(12) United States Patent
Momose et al.

(10) Patent No.: US 9,469,203 B2
(45) Date of Patent: Oct. 18, 2016

(54) BATTERY INFORMATION OUTPUT EQUIPMENT FOR POWER SUPPLY AND DEMAND LEVELING SYSTEM

(75) Inventors: Nobuo Momose, Okazaki (JP); Makoto Kataniwa, Chiba (JP); Yasuhiro Nakai, Bangkok (TH); Hiroyuki Kumazawa, Hyogo (JP); Tatsuji Munaka, Kanagawa (JP); Yuichiro Shimura, Tokyo (JP); Hiroshi Tanaka, Kawasaki (JP); Hiroshi Irie, Tokyo (JP); Hitoshi Maejima, Saitama (JP)

(73) Assignees: Mitsubishi Jidosha Kogyo Kabushiki Kaisha, Tokyo (JP); Mitsubishi Corporation, Tokyo (JP); Mitsubishi Denki Kabushiki Kaisha, Tokyo (JP); Mitsubishi Research Institute, Inc., Tokyo (JP)

( * ) Notice: Subject to any disclaimer, the term of this patent is extended or adjusted under 35 U.S.C. 154(b) by 602 days.

(21) Appl. No.: 13/814,157

(22) PCT Filed: Jul. 29, 2011

(86) PCT No.: PCT/JP2011/067415
§ 371 (c)(1),
(2), (4) Date: Mar. 11, 2013

(87) PCT Pub. No.: WO2012/017936
PCT Pub. Date: Feb. 9, 2012

(65) Prior Publication Data
US 2013/0162025 A1  Jun. 27, 2013

(30) Foreign Application Priority Data

Aug. 5, 2010  (JP) ................................ 2010-176161

(51) Int. Cl.
*B60L 11/18* (2006.01)
*H02J 7/00* (2006.01)
(Continued)

(52) U.S. Cl.
CPC ........ *B60L 11/1809* (2013.01); *B60L 11/1842* (2013.01); *B60L 11/1862* (2013.01);
(Continued)

(58) Field of Classification Search
CPC ........... Y02T 10/7005; Y02T 10/7077; Y02T 10/7044; Y02T 10/705; Y02T 90/121; Y02T 90/128; Y02T 90/14; Y02T 90/163; Y02T 90/168; B60R 16/03; B60R 16/0315; B60L 11/14; B60L 11/1842; B60L 11/1862; H02J 13/0006; H02J 3/32; H02J 7/0047; H02J 13/0072; H01M 10/44; H01M 10/465; Y02E 60/721; Y04S 10/126; Y04S 30/12
USPC ......................................................... 307/9.1
See application file for complete search history.

(56) References Cited

U.S. PATENT DOCUMENTS 5,642,270 A * 6/1997 Green ................... B60L 11/126
                                                            363/17
(Continued)

FOREIGN PATENT DOCUMENTS

JP       2003-259696 A       9/2003
JP       2004-298549 A       10/2004
(Continued)

OTHER PUBLICATIONS

Japanese Office Action has issued Japanese Application No. 2012-527709 dated Jan. 22, 2014.

*Primary Examiner* — Thienvu Tran
*Assistant Examiner* — Brian K Baxter
(74) *Attorney, Agent, or Firm* — Birch, Stewart, Kolasch & Birch, LLP

(57) ABSTRACT

Battery information output equipment allows a driver of an electric vehicle 10 of an electricity consumer 2, now parked, to input what battery capacity is required at two or more points of time on or before the time at which the electric vehicle is scheduled to come into use, considering an operation schedule for the vehicle, and transmits the usable capacity at each point of the times, i.e., maximum capacity minus capacity required at each point of the times, to a power supply/demand management center 3, so that charge and discharge of a battery 17 is controlled by a charge/discharge command from the power supply/demand management center 3 such that use of battery capacity for power supply and demand leveling is kept within the usable capacity at any point of the times.

7 Claims, 2 Drawing Sheets

(51) Int. Cl.
*H02J 13/00* (2006.01)
*H02J 3/32* (2006.01)
*H01M 10/44* (2006.01)
*H01M 10/46* (2006.01)

(52) U.S. Cl.
CPC .............. *H02J 3/32* (2013.01); *H02J 7/0047* (2013.01); *H02J 13/0006* (2013.01); *H01M 10/44* (2013.01); *H01M 10/465* (2013.01); *H02J 13/0072* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 30/12* (2013.01)

(56) References Cited

U.S. PATENT DOCUMENTS

| | | | |
|---|---|---|---|
| 2005/0127855 A1* | 6/2005 | Wobben | B60L 3/0046 318/139 |
| 2008/0203973 A1* | 8/2008 | Gale | B60L 11/1816 320/157 |
| 2009/0043520 A1* | 2/2009 | Pollack et al. | 702/62 |
| 2009/0229900 A1* | 9/2009 | Hafner | B60L 3/0046 180/65.275 |
| 2010/0076825 A1* | 3/2010 | Sato | B60L 3/12 705/14.1 |
| 2010/0094496 A1* | 4/2010 | Hershkovitz et al. | 701/22 |
| 2010/0176765 A1 | 7/2010 | Shigemizu et al. | |
| 2010/0217485 A1 | 8/2010 | Ichishi | |
| 2010/0274656 A1* | 10/2010 | Genschel | G06Q 30/00 705/14.27 |
| 2011/0001356 A1* | 1/2011 | Pollack | B60L 11/1842 307/31 |
| 2011/0015799 A1* | 1/2011 | Pollack | B60L 11/1824 700/291 |
| 2011/0196692 A1* | 8/2011 | Chavez et al. | 705/1.1 |
| 2011/0202418 A1* | 8/2011 | Kempton | B60L 11/1824 705/26.1 |
| 2011/0204720 A1* | 8/2011 | Ruiz | B60L 11/1816 307/66 |
| 2011/0302078 A1* | 12/2011 | Failing | B60L 3/00 705/39 |
| 2011/0313603 A1* | 12/2011 | Laberteaux | B60L 11/184 701/22 |
| 2012/0271723 A1* | 10/2012 | Penilla | G06Q 20/18 705/16 |
| 2013/0179061 A1* | 7/2013 | Gadh | B60L 11/1842 701/123 |

FOREIGN PATENT DOCUMENTS

| | | |
|---|---|---|
| JP | 2008-154360 A | 7/2008 |
| JP | 2008-268477 A | 11/2008 |
| JP | 2008-276950 A | 11/2008 |
| JP | 2009-136109 A | 6/2009 |
| JP | 4426504 B2 | 3/2010 |
| JP | 2010-098793 A | 4/2010 |

* cited by examiner

BATTERY INFORMATION OUTPUT EQUIPMENT FOR POWER SUPPLY AND DEMAND LEVELING SYSTEM

TECHNICAL FIELD

The present invention relates to a power supply and demand leveling system, which supplies electricity from electricity utilities such as electric power companies to electricity consumers, including factories, business institutions and homes, through distribution lines, and levels power supply and demand by controlling the charge/discharge of batteries of electric vehicles parked at the electricity consumers according to a charge/discharge command that is outputted from a power supply/demand management center on the basis of power supply/demand information transmitted from the electricity utilities. More specifically, the present invention relates to battery information output equipment for transmitting battery information about an electric vehicle from an electricity consumer side to a power supply/demand management side in order for an optimized charge/discharge command to be created and transmitted to the electricity consumer side. In this specification, the electricity utilities mean not only electric power companies serving as utilities but also grid operators, such as ISO (independent system operator), TSO (transmission system operator), and IESO (independent electricity system operator).

BACKGROUND ART

This type of systems for leveling power supply and demand include a system using stationary batteries set in electricity consumers. This system charges the batteries during night when electricity demand is relatively low, and discharges the batteries during daytime when electricity demand is at its peak, thus leveling power supply and demand. Such a power supply and demand leveling system, which uses the stationary batteries, however, requires a large-scale installation. This makes it difficult to employ the system at low cost.

To solve this problem, it has lately been suggested to utilize a power supply and demand leveling system, which uses batteries installed in electric vehicles or hybrid electric vehicles (hereinafter, collectively referred to as electric vehicles) instead of using stationary batteries. The power supply and demand leveling system like this was made in light of the fact that an electric vehicle used for commuting to and from a business institution who is an electricity consumer remains parked during daytime when electricity demand is at its peak, and thus that there is a battery capacity available for use.

The system aims at leveling power supply and demand without large initial investment as in the case of using stationary batteries, by discharging batteries of electric vehicles parked on the premises of factories, businesses and the like by a charge/discharge command transmitted from a power supply/demand management center during demand peak periods, thereby compensating for deficiency of power supply, and charging them in the evening with low demand relative to power supply capacity, or in the night after returning home.

For example, patent document 1 proposes an example of control of charge and discharge of a battery by a charge/discharge command from a power supply/demand management center. In the power supply and demand leveling system disclosed in patent document 1, if the capacity of a battery of an electric vehicle parked is higher than a preset criterion, the battery is discharged to the preset criterion capacity for power supply and demand leveling.

PRIOR ART DOCUMENT

Patent Document

Patent Document 1: JP 4426504 B

SUMMARY OF THE INVENTION

Problems to be Solved by the Invention

Control of charge and discharge of a battery in the power supply and demand leveling system disclosed in patent document 1 is however coarse; it does not always make efficient use of batteries of electric vehicles. Specifically, the technique disclosed in patent document 1, which controls charge and discharge of batteries uniformly on the preset criterion, can prevent excessive discharge of the batteries, but cannot utilize the power stored in the battery at the preset criterion capacity for power supply and demand leveling. Simply lowering the criterion may lead to excessive discharge of batteries.

What degree of battery capacity can be used for power supply and demand leveling, or in other words, up to what capacity the battery may be discharged for power supply and demand leveling is closely connected with an operation schedule for the electric vehicle. For example, if the electric vehicle is to come into use soon, discharge of the battery needs to be inhibited to ensure a sufficiently high capacity in order not to disrupt operation of the electric vehicle, and if not, discharging the battery to a considerably low capacity will not disrupt operation of the electric vehicle.

It is clear that the technique disclosed in patent document 1, which pays no consideration to the operation schedule for the electric vehicle, cannot meet both requirements: prevention of excessive discharge of the battery and efficient use of battery capacity for power supply and demand leveling.

The present invention has been made to solve the above problem. An object of the present invention is to provide battery information output equipment for a power supply and demand leveling system which enables charge and discharge of a battery of an electric vehicle of an electricity consumer, now parked, to be appropriately controlled such that the battery capacity is made best use of for power supply and demand leveling while preventing excessive discharge that disrupts operation of the electric vehicle.

Means for Solving the Problems

In order to achieve the above object, the present invention provides battery information output equipment for a power supply and demand leveling system in which electric power is supplied from an electricity utility to electricity consumers via distribution lines, and when an electric vehicle of an electricity consumer is parked and connected to the distribution lines, a charge/discharge command relevant to a battery of the electric vehicle is transmitted from a power supply/demand management device to the electricity consumer to control charge and discharge of the battery of the electric vehicle for power supply and demand leveling by using a charge/discharge controller of the electricity consumer, the battery information output equipment comprising an input device for inputting plural times and a usable capacity of the battery for power supply and demand leveling by controlling charge and discharge of the battery at each point of the times after the electric vehicle is connected to the distribution lines, considering the electricity consumer's operation schedule for the electric vehicle, and an output device for transmitting the usable capacity inputted with the input device at each point of the times to the power supply/demand management device, wherein the input device and the output device each being provided to at least either the electric vehicle or a place of the electricity consumer where the electric vehicle is parked.

Desirably, the output device takes in at least either an accumulated power limiting value to limit accumulated power supplied to and from the battery or a maximum rate limiting value to limit maximum rate of power supplied to and from the battery, and transmits the taken-in limiting value to the power supply/demand management device with the usable capacity at each point of the times.

Desirably, the battery information output equipment further comprises a limiting-value correction device for correcting the accumulated power limiting value or the maximum rate limiting value depending on at least either duration of use of the battery or temperature of the battery, wherein the output device transmits the accumulated power limiting value or the maximum rate limiting value corrected by the limiting-value correction device.

Desirably, the input device is designed to be inputted by specifying two or more points in a coordinate system consisting of an axis of time and an axis of the usable capacity of the battery.

Advantageous Effects of the Invention

As stated above, the battery information output equipment for a power supply and demand leveling system according to the present invention allows an electricity consumer to input plural times and a usable capacity of the battery at each point of the times after the electric vehicle is connected to the distribution lines to make the battery usable for power supply and demand leveling, considering an operation schedule for an electric vehicle, with an input device, wherein the usable capacity inputted at each point of the times is transmitted to a power supply/demand device by an output device. This enables charge and discharge of the battery of the electricity consumer's electric vehicle to be controlled by a charge/discharge command from the power supply/demand device such that use of battery capacity is kept within the usable capacity at any point of the times. The present invention thus makes it possible to make best use of the battery capacity for power supply and demand leveling while preventing excessive discharge of the battery that disrupts operation of the electric vehicle.

Since the output device takes in and transmits to the power supply/demand management device at least either an accumulated power limiting value to limit accumulated power supplied to and from the battery or a maximum rate limiting value to limit maximum rate of power supplied to and from the battery, the power supply/demand management device can create a charge/discharge command based on not only the usable capacity at each point of the times but also the accumulated power limiting value and/or the maximum rate limiting value. By the charge/discharge command created this way, so frequent charge and discharge of the electricity consumer's battery as exceeding the accumulated power limiting value and/or so rapid charge and discharge of the electricity consumer's battery as exceeding the maximum rate limiting value is prevented, and thus, degradation of the battery is restricted.

By correcting the accumulated power limiting value and/or the maximum rate limiting value depending on duration of use of the battery and/or temperature of the battery, each being a factor affecting how much the battery is degraded by charge and discharge, charge and discharge of the battery is limited to an appropriate frequency and an appropriate rate, irrespective of duration of use of the battery and/or temperature of the battery. The battery degradation is thus restricted with increased reliability.

The battery information output equipment designed to be inputted by specifying two or more points in a coordinate system consisting of an axis of time and an axis of the usable capacity of the battery provides ease of understanding and inputting, and thus increased convenience.

MODE FOR CARRYING OUT THE INVENTION

[First Embodiment]

Now, battery information output equipment for a power supply and demand leveling system, which is an embodiment of the present invention, will be described.

Figure 1:
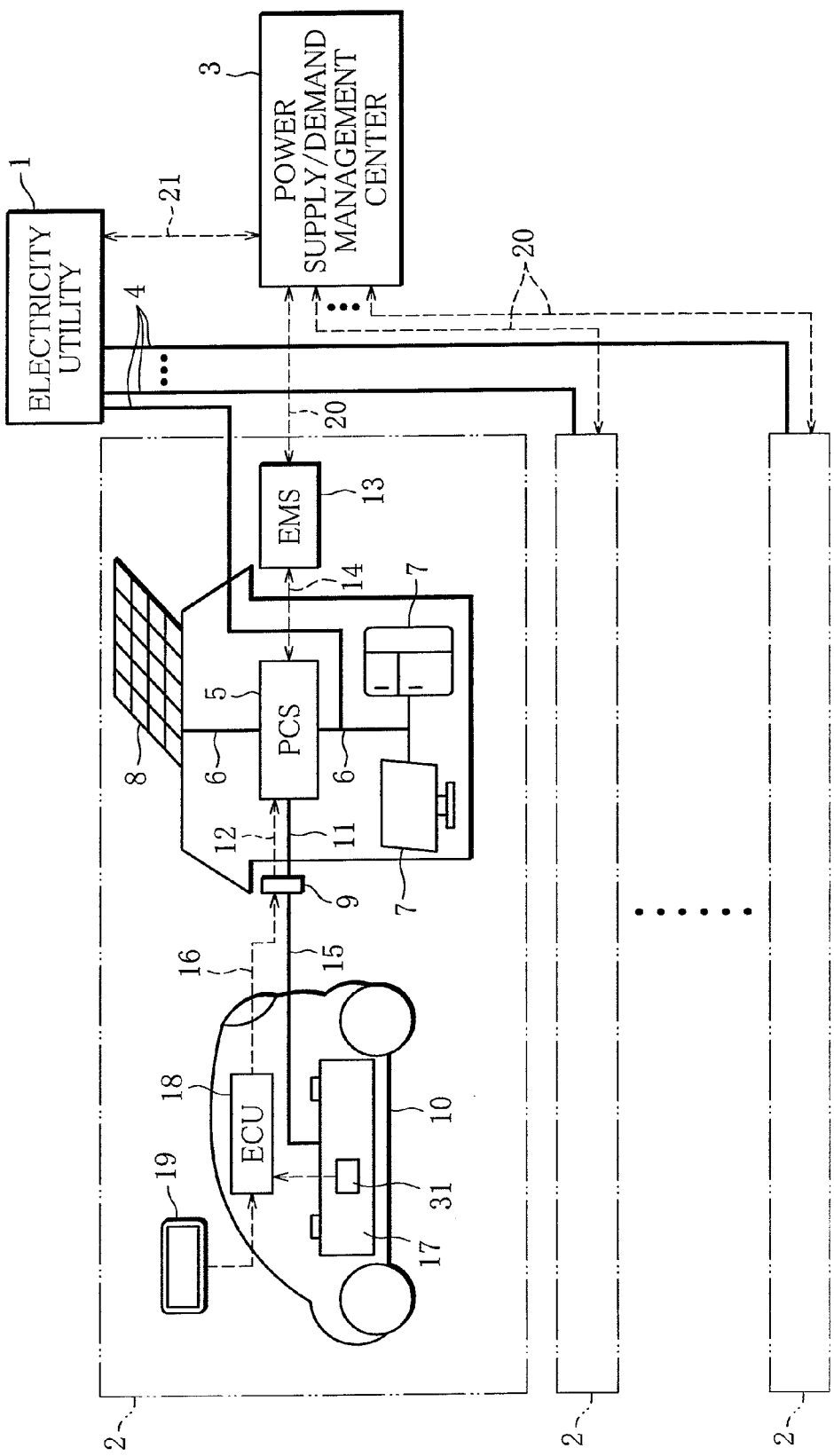
FIG. 1 is a view of the entire configuration of a power supply and demand leveling system to which an embodiment of battery information output equipment is applied.

FIG. 1 is a diagram showing an overall configuration of a power supply and demand leveling system to which an embodiment of battery information output equipment is applied.

The power supply and demand leveling system (so-called smart grid; hereinafter referred to also as "smart grid") is formed of an electricity utility 1 such as an electric power company, a plurality of electricity consumers 2 including homes or factories and business institutions (constituting a smart grid), and a power supply/demand management center (power supply/demand management device) 3 that regulates and levels power supply and demand in the smart grid.

Each electricity consumer 2 is connected through a distribution line 4 to the electricity utility 1. The electricity generated at a power plant, not shown, is supplied from the electricity utility 1 through distribution lines 4 to the electricity consumers 2. If one of the electricity consumers 2 has power-generating equipment, such as a solar panel and a wind generator, and there generates excess electricity that is produced by the power-generating equipment and is not used by the electricity consumer 2, the excess electricity is supplied from the distribution lines 4 through the electricity utility 1 to other electricity consumers 2.

FIG. 1 is a detail view showing a standard home as an example of an electricity consumer. In this case, electricity from the electricity utility 1 is supplied through power lines 6 in the home to a power controller 5 (hereinafter, referred to as PCS) serving as an AC-DC converter and to electricity loads 7, such as a TV and a refrigerator, which are situated in the home.

In this example, a solar panel 8 is set on the roof. The electricity generated by the solar panel 8 is secondarily used by being supplied through the PCS 5 to the electricity load 7.

A connection port 9 is provided in a predetermined position of the electricity consumer 2, for example, in an exterior wall of a house in the case of the home. The connection port 9 is used to input and output power for battery charge between the electricity consumer 2 and an electric vehicle 10 parked at the electricity consumer 2 and also used to input and output the battery information described later.

More specifically, the PCS 5 of the home is connected to the connection port 9 through a power line 11 and a signal line 12, and is also connected through the signal line 14 to an energy management system 13 (hereinafter, referred to as EMS) that regulates the power supply and demand within the home.

The connection port 9 is arbitrarily connected with a power line 15 and a signal line 16 (actually combined into a single wire outside the vehicle) both extending from the electric vehicle 10. In the inside of the vehicle, the power line 15 is connected to a battery 17, and the signal line 16 is connected to an ECU 18 (electronic control unit) that conducts, in an integrated way, motor control for moving the vehicle, the management of remaining capacity of the battery 17 during the drive of the vehicle, air-conditioner control, the control of a navigator placed in a driver's seat, etc.

As described later, the battery 17 of the electric vehicle 10 is used for equilibration of power supply and demand in the smart grid. For that reason, even if battery charge is not necessary, it is recommended that the battery 17 be immediately connected to the connection port 9 after the vehicle 10 returns home or arrives at a factory or business institution.

Although not shown, the ECU 18 is formed of an input/output device, a memory unit (ROM, RAM or the like) used to store a control program, a control map, etc., a central processing unit (CPU), a timer, and the like. An input side of the ECU 18 is connected with a touch-screen display 19 of the navigator, so that a driver can arbitrarily enter information into the ECU 18 with the display 19.

The EMS 13 of the electricity consumer 2 is connected to the power supply/demand management center 3 through a signal line 20 such as a telephone line. The EMS enters battery information from the ECU 18 of the electric vehicle 10 through the connection port 9 and the PCS 5. The battery information is outputted to the power supply/demand management center 3.

The power supply/demand management center 3 is connected to the electricity utility 1 by signal lines 21 such as telephone lines. The electricity utility 1 transmits power supply/demand information to the power supply/demand management center 3 to inform of deficiency or excess of power supply/demand in the smart grid (power supply/demand to each electricity consumer 2).

The power supply/demand management center 3 can thus grasp whether the electric vehicle 10 of each electricity consumer 2 is parked or not and, if the electric vehicle 10 is parked, battery information, and also grasp deficiency or excess of power supply in the smart grid from power supply/demand information. For power supply and demand leveling, batteries 17 of electric vehicles 10 of electricity consumers 2 that are parked are charged and discharged by a charge/discharge command, transmitted from the power supply/demand management center 3 to the EMS 13 of each electricity consumer 2 to make the PCS 5 function as an AC-DC converter (charge/discharge controller).

For power supply and demand leveling, batteries of electric vehicles 10 parked are charged and discharged via EMSs 13 of electricity consumers 2. However, as mentioned in the section headed "Problems to be solved by the Invention", if charge and discharge of the battery 17 is not appropriately controlled, it results in excessive discharge or excessively-restricted discharge of the battery 17; the former disrupts operation of the electric vehicle 10, and the latter means that the battery capacity is not made efficient use of.

To deal with this problem, the present embodiment is designed for a driver of an electric vehicle 10 of an electricity consumer 2, now parked, to input, in advance, what degree of battery 17 capacity is usable as a usable capacity for power supply and demand leveling at each point of time, considering an operation schedule for the electric vehicle 17, so that charge and discharge of the battery 17 is controlled such that use of battery capacity is kept within the usable capacity at any point of time. Next, this process will be described in detail.

Figure 2:
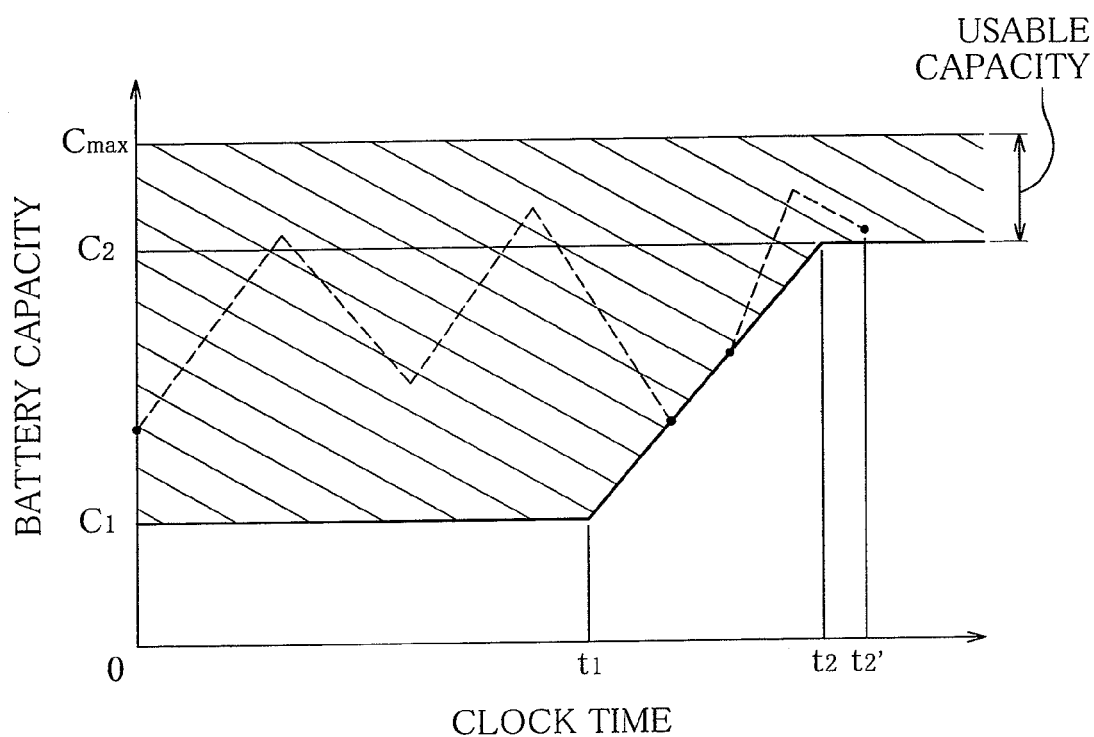
FIG. 2 is a graph showing an example of input of the usable capacity of the battery for each clock time.

FIG. 2 is a graph showing an example of input of the usable capacity of the battery 17 with respect to the electric vehicle 10 parked at the electricity consumer 2 for each clock time. A vertical axis in FIG. 2 shows the battery capacity in proportion to an entire capacity Cmax. A horizontal axis in FIG. 2 shows a clock time counted from a time point when the electric vehicle 10 is connected to the connection port 9 of the electricity consumer 2.

The input of the usable capacity of the battery 17 with respect to each clock time is conducted using as an index a required capacity (entire capacity Cmax-usable capacity) that is a battery capacity to be secured. In the example of the input shown in FIG. 2, the electric vehicle 10 is scheduled to be used not at or before clock time t1 but at clock time t2. The example shows that there is the possibility that the start of using the electric vehicle 10 will be hastened within a time period between the clock time t1 and the clock time t2 due to schedule change.

For that reason, during a time period before clock time t1 where the electric vehicle 10 is not scheduled to be used, C1 is entered to secure a minimum battery capacity, and the battery capacity is gradually increased during the time period between the clock time t1 and the clock time t2 where there is the possibility that the electric vehicle 10 starts to be used when the schedule is changed. During a time period after the clock time t2 where the electric vehicle 10 almost certainly starts to be used, C2 (determined in view of distance to drive) is entered as a battery capacity sufficient for drive.

A hatched zone in FIG. 2, which is obtained by subtracting the required capacities C1 and C2 from the entire capacity Cmax at the respective clock times, is set as a usable capacity. At time t2, for example, Cmax minus C2 is the usable capacity. Thus, the shaded area in FIG. 2 represents the usable capacity at each point of the times. By controlling charge and discharge of the battery such that use of battery capacity is kept within this area at any point of the times, the battery capacity can be made best use of for power supply and demand leveling without a risk of excessive discharge of the battery 17.

Needless to say, FIG. 2 is only one example of input of the usable capacity. Graphs with various characteristics can be set according to the operation conditions of the electric vehicle 10. In the foregoing example, the capacity that is usable until the start of the next use is entered. However, it is also possible to enter the capacity that is usable until the electric vehicle 10 starts to be used after the next or the capacity that is usable for the next one month according to drive schedules of the electric vehicle 10 of the next one month.

The actual input by a driver is carried out using, for example, the touch-screen display 19 of the navigator (input device). More specifically, an empty graph (including only vertical and horizontal axes) similar to FIG. 2 is displayed on the display 19. The driver sequentially touches points at the intersections between the clock times when the electric vehicle 10 starts being used and the required capacities for these clock times, thus determining t1, C1, t2 and C2. The graph is made by automatically connecting the intersection points. The input of the usable capacity for each clock time, however, is not limited to this example. For example, the clock times t1 and t2 and the required capacities C1 and C2 may be entered with keys.

The usable capacity for each clock time which is set as described above is entered from the ECU 18 through the connection port 9 and the PCS 5 into the EMS 13, and passed on from the EMS 13 to the power supply/demand management center 3 (output device). The power supply/demand management center 3 creates a charge/discharge command on the basis of the usable capacity, transmitted from the electricity consumer 2 side, and transmits it to the electricity consumer 2 side for power supply and demand leveling. By the charge/discharge command created this way, charge and discharge of the battery 17 of the electricity consumer 2's electric vehicle 10 is controlled such that use of battery capacity is kept within the usable capacity at any point of the times.

FIG. 2 shows the charge/discharge condition of the battery 17 by a broken line. For example, when power supply in the smart grid is excess, the battery 17 is controlled to the charge side by the electricity consumers 2 to charge the battery 17 with excess electricity. When the electricity supply in the smart grid is deficient, the battery 17 is controlled to the discharge side to compensate the deficiency of electricity. These charge/discharge controls are implemented within a range of the usable capacity in any case.

For example, as shown between the clock times t1 and t2 in FIG. 2, when the battery capacity is deviated from a lower limit of the usable capacity (falls lower than the required capacity) during discharge, the battery capacity is controlled to the lower limit of the usable capacity. In FIG. 2, the start of use of the electric vehicle 10 is delayed from the estimated clock time t2 to t2'. Such a time lag of the drive start estimation often happens.

Nonetheless, the battery capacity C2 usable for drive continues to be secured after the clock time t2, so that the drive of the vehicle can be started without problem.

As explained above, the present embodiment of battery information output equipment for a power supply and demand leveling system is designed for a driver of an electric vehicle 10 of an electricity consumer 2, now parked, to input the usable capacity of battery 17 of the electric vehicle 10 for power supply and demand leveling at each point of the times, considering an operation schedule for the electric vehicle 10, where the usable capacity inputted at each point of the times is transmitted from the battery information output equipment to the power supply/demand management center 3.

On the basis of the usable capacity at each point of the times, transmitted from the electricity consumer 2 side, the power supply/demand management center 3 creates a charge/discharge command to control charge and discharge of the battery 17 of the electricity consumer 2's vehicle 10 such that use of battery capacity is kept within the usable capacity at any point of the times. By controlling charge and discharge of the battery 17 of the electricity consumer 2 by this charge/discharge command, the battery capacity is made best use of for power supply and demand leveling while preventing a risk of excessive discharge of the battery 17 that disrupts the operation of the electric vehicle 10.

When the electricity consumer 2 is a factory, a business or the like and has two or more electric vehicles 2, those two or more electric vehicles 10 of a single electricity consumer may be connected to the smart grid at a time. In this case, the electric vehicles connected experience charge and discharge control, respectively.

[Second Embodiment]

Next, a second embodiment of battery information output equipment for a power supply and demand leveling system according to the present invention will be described.

The second embodiment of battery information output equipment is similar in basic configuration to the first embodiment; they are distinguished by the former having a measure to restrict degradation of the battery 17. Specifically, as described with regard to the first embodiment, the battery 17 is charged and discharged not only for moving the vehicle but also for power supply and demand leveling. Thus, minimizing the degradation of the battery caused by charge and discharge is desired. The present embodiment is therefore arranged to prevent frequent and/or rapid charge and discharge of the battery 17 in order not to accelerate degradation of the battery, as described below.

As indicated in FIG. 1, to the input of the ECU 18 is connected a temperature sensor 31 fitted to the battery 17 so that battery temperature detected by the temperature sensor 31 is fed to the ECU.

The ECU 18 holds in its memory an accumulated power limiting value to limit accumulated power supplied to and from the battery 17, and a maximum rate limiting value to limit the maximum rate of charge or discharge of the battery 17. These limiting values are determined on the basis of the characteristics of the fresh battery 17 at normal service temperature.

The accumulated power supplied to and from the battery 17 is the sum of amounts of power supplied to or from the battery 17 in each charge or discharge process, where the power supplied from the battery as well as the power supplied to the battery is handled as a positive value. Greater accumulated power can be taken as indicating more frequent charge and discharge. The maximum rate of charge or discharge is the maximum rate of change of capacity with respect to time. Greater rate of change of capacity means more rapid charge or discharge.

The accumulated power limiting value and the maximum rate limiting value are each set to be close to a limit not resulting in unacceptably fast degradation of the battery 17, and each peculiar to the battery 17. The appropriate accumulated power limiting value as well as the appropriate maximum rate limiting value, however, varies depending on how much the battery 17 is already degraded through use and how far the temperature of the battery 17 is different from the normal service temperature. For example, charge and discharge is a greater burden for the battery more degraded through use, or having temperature to a greater extent higher or lower than the normal service temperature. Such battery therefore requires lower limiting values to avoid accelerated degradation.

Thus, in addition to the accumulated power limiting value and the maximum rate limiting value, the ECU 18 holds in its memory a map for use in correcting these limiting values depending on duration of use of the battery 17 and temperature of the battery 17. Here, the duration of use of battery 17 is obtained by the ECU 18 by summing durations of charge and discharge performed on the battery 17 for vehicle moving or power supply and demand leveling.

For control of charge and discharge of the battery 17, the ECU 18 corrects the accumulated power limiting value and the maximum rate limiting value depending on the duration of use of battery 17, obtained by summing durations of charge and discharge as mentioned above, and the temperature of the battery 17, detected by the temperature sensor 31 (limiting-value correction device), and transmits the corrected limiting values to the power supply/demand management center 3, together with the usable capacity at each point of the times mentioned above.

This allows the power supply/demand management center 3 to create a charge/discharge command for the electricity consumer 2' battery 17 based on not only the usable capacity at each point of the times but also the accumulated power limiting value and the maximum rate limiting value. By the charge/discharge command created this way, charge and discharge of the electricity consumer 2's battery 17 is controlled such that the accumulated power supplied to and from the battery does not exceed the maximum power limiting value and the maximum rate of charge and discharge does not exceed the maximum rate limiting value.

More specifically, if the accumulated power supplied to or from the battery 17 reaches the accumulated power limiting value during charging or discharging, for example, the charging or discharging is stopped immediately. Even if power supply/demand information suggests the situation requiring rapid charge or discharge of the battery 17 to deal with power excess or deficiency, the maximum rate of charge or discharge of the battery 17 is limited to the maximum rate limiting value. In this way, frequent and/or rapid charge and discharge of the battery 17 is prevented to restrict degradation of the battery 17.

The accumulated power limiting value and the maximum rate limiting value are corrected depending on the duration of use of battery 17 and the temperature of the battery 17, which are factors affecting how much the battery is degraded by charge and discharge. This ensures that charge and discharge of the battery is limited to an appropriate frequency and an appropriate rate irrespective of duration of use of the battery and temperature of the battery. The battery degradation is thus restricted with increased reliability.

In the above, embodiments of the present invention have been described. The present invention is however not restricted to the described embodiments. For example, in the described embodiments, the usable capacity at each point of the times is inputted on the touch-screen display installed on the electric vehicle 10, and the information inputted is transmitted to the power supply/demand management center 3 via the EMS 13 installed in the home. The present invention is however not restricted to this way of inputting and transmitting the information.

For example, it is possible to connect an input device in the home to the EMS 13 and input the usable capacity at each point of the times with this input device, in place of the touch-screen display 19 installed on the electric vehicle 10. It is also possible to install a communication device on the electric vehicle 10 to transmit the usable capacity at each point of the times, inputted on the touch-screen display 19, to the power supply/demand management center 3, not via the EMS 13.

In the described embodiment, charge and discharge of the battery 17 is controlled not to exceed the accumulated power limiting value or the maximum rate limiting value. These limitations are however not absolutely necessary: both or either of the limitations may be omitted. Correction of the accumulated power limiting value and the maximum rate limiting value depending on the duration of use of the battery 17 and the temperature of the battery 17 is not absolutely necessary, either; correction of both or either of the limiting values may be omitted.

The application of the present invention is not restricted to electric vehicles 10 of the type exemplified in the described embodiments; it is applicable also to plug-in hybrid vehicles.

EXPLANATION OF REFERENCE SIGNS

1 Electricity utility
2 Electricity consumer
3 Electricity supply/demand management center
4 Distribution lines
10 Electric vehicle
13 EMS (output device, charge/discharge controller)
17 Battery
18 ECU (Limiting-value correction device)
19 Touch-screen display (input device)

The invention claimed is:

1. Battery information output equipment for a power supply and demand leveling system in which electric power is supplied from an electricity utility to electricity consumers via distribution lines, and when an electric vehicle of an electricity consumer is parked and connected to the distribution lines, a charge/discharge command relevant to a batter of the electric vehicle is transmitted from a power supply/demand management device to the electricity consumer on the basis of power supply/demand information transmitted from the electricity utility to control charge and discharge of the battery of the electric vehicle for power supply and demand leveling by using a charge/discharge controller, the battery information output equipment comprising:

an input device for inputting plural times after the electric vehicle is connected to the distribution lines and a usable capacity of the battery at each point of the times for power supply and demand leveling by controlling charge and discharge of the battery, by specifying two or more points in a coordinate system consisting of an axis of time and an axis of the usable capacity in an entire capacity of the battery using as an index a required capacity that is a battery capacity to be secured, considering the electricity consumer's operation schedule for the electric vehicle, and an output device for transmitting the usable capacity at each point of the times inputted with the input device to the power supply/demand management device, wherein the input device and the output device each being provided to at least either the electric vehicle or a place of the electricity consumer where the electric vehicle is parked.

2. The battery information output equipment according to claim 1, wherein the output device takes in an accumulated power limiting value to limit accumulated power supplied to and from the battery and transmits the accumulated power limiting value to the power supply/demand management device with the usable capacity at each point of the times.

3. The battery information output equipment according to claim 2, further comprising:

a limiting-value correction device for correcting the accumulated power limiting value depending on duration of use of the battery, wherein the output device transmits the accumulated power limiting value corrected by the limiting-value correction device.

4. The battery information output equipment according to claim 2, further comprising:
a limiting-value correction device for correcting the accumulated power limiting value depending on temperature of the battery, wherein
the output device transmits the accumulated power limiting value corrected by the limiting-value correction device.

5. The battery information output equipment according to claim 1, wherein
the output device takes in a maximum rate limiting value to limit maximum rate of power supplied to and from the battery and transmits the maximum rate limiting value to the power supply/demand management device with the usable capacity at each point of the times.

6. The battery information output equipment according to claim 5, further comprising:
a limiting-value correction device for correcting the maximum rate limiting value depending on duration of use of the battery, wherein
the output device transmits the maximum rate limiting value corrected by the limiting-value correction device.

7. The battery information output equipment according to claim 5, further comprising:
a limiting-value correction device for correcting the maximum rate limiting value depending on temperature of the battery, wherein
the output device transmits the maximum rate limiting value corrected by the limiting-value correction device.

* * * * *